No. 834,243. PATENTED OCT. 30, 1906.
R. B. ARNOLD.
WEIGHING WAGON.
APPLICATION FILED MAY 11, 1906.

2 SHEETS—SHEET 1.

Witnesses
D. O. Langworthy
D. L. Loveley

Inventor
Robert B. Arnold
By Watson E. Coleman
Attorney

THE NORRIS PETERS CO., WASHINGTON, D. C.

No. 834,243. PATENTED OCT. 30, 1906.
R. B. ARNOLD.
WEIGHING WAGON.
APPLICATION FILED MAY 11, 1906.

2 SHEETS—SHEET 2.

UNITED STATES PATENT OFFICE.

ROBERT B. ARNOLD, OF PATTON, ALABAMA.

WEIGHING-WAGON.

No. 834,243.  Specification of Letters Patent.  Patented Oct. 30, 1906.

Application filed May 11, 1906. Serial No. 316,393.

*To all whom it may concern:*

Be it known that I, ROBERT B. ARNOLD, a citizen of the United States, residing at Patton, in the county of Walker and State of Alabama, have invented certain new and useful Improvements in Weighing-Wagons, of which the following is a specification, reference being had therein to the accompanying drawings.

This invention relates to improvements in wagons having weighing-scales thereon for supporting their bodies when it is desired to weigh the contents of the same.

One of the objects of the invention is to provide a simple and practical weighing-wagon of this character in which the wagon-body and the scale-levers will be independently supported by the frame when it is not desired to use the scales and in which the scale-levers may be readily elevated so that they will raise and support the body for the purpose of weighing its contents.

Further objects and advantages of the invention, as well as the structural features by means of which they are attained, will be made clear by an examination of the following specification, taken in connection with the accompanying drawings, in which—

Figure 1:
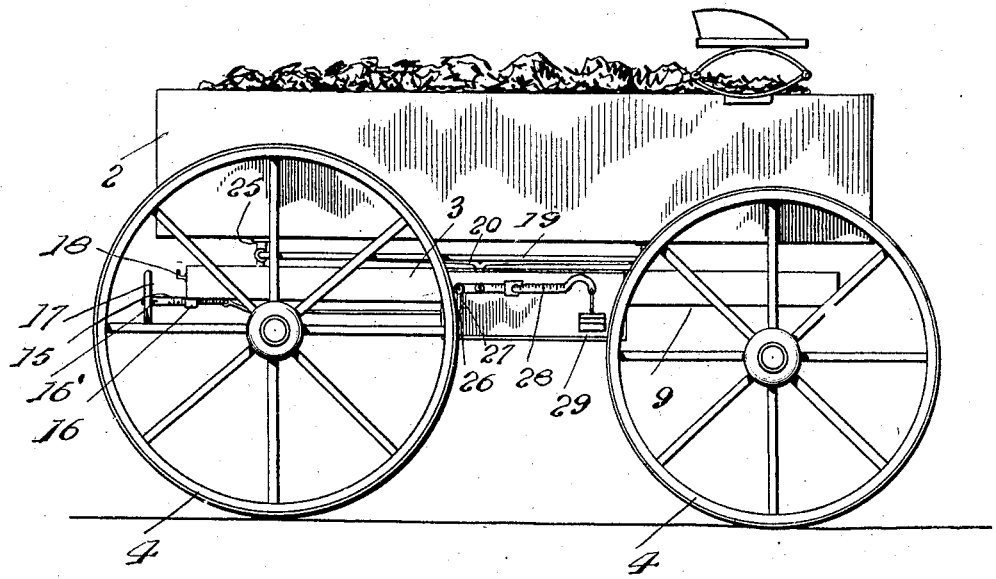
Figure 4:
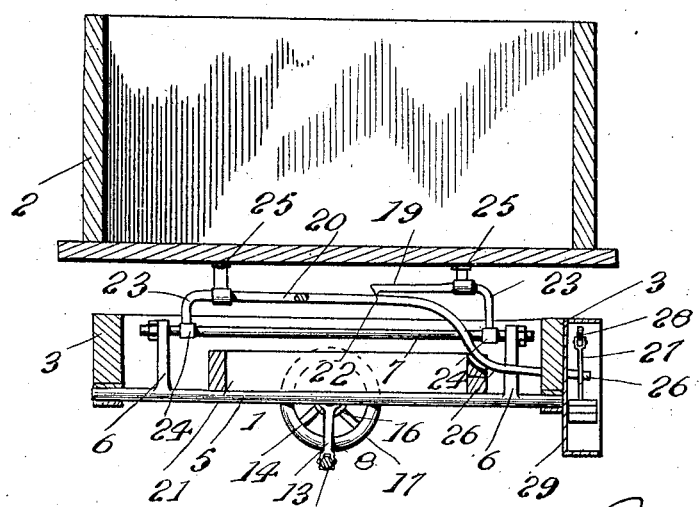
Figure 2:
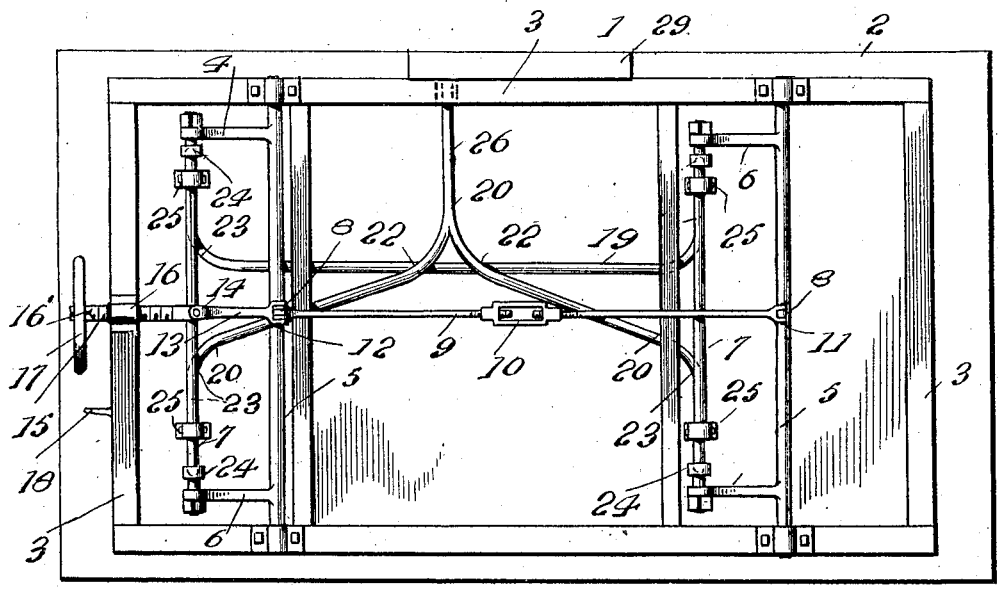
Figure 3:
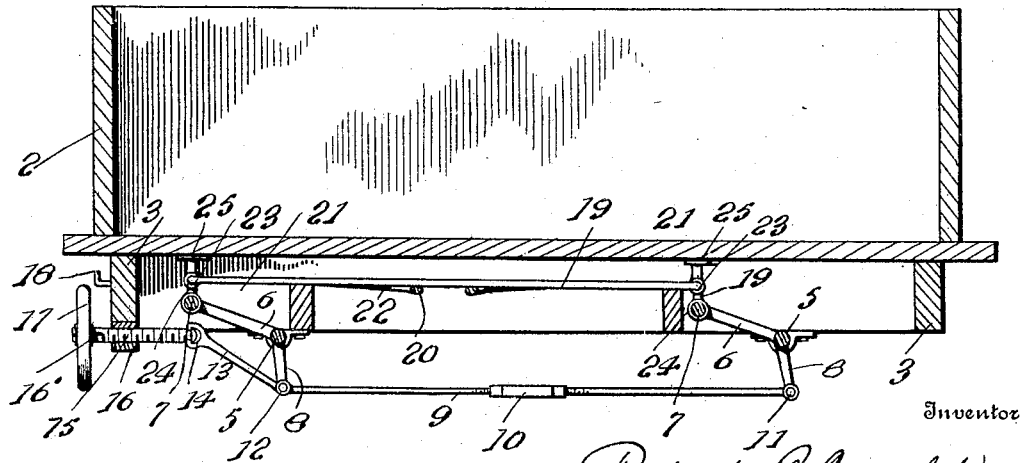

Figure 1 is a side elevation of my improved weighing-wagon, showing the parts in their elevated position ready for weighing the contents of the wagon-body. Fig. 2 is a bottom plan view of the wagon, the wheels being omitted. Fig. 3 is a detail longitudinal sectional view showing the parts in their normal or lowered position, and Fig. 4 is a vertical transverse sectional view showing the parts in their elevated position.

Referring to the drawings by numeral, 1 denotes a wagon or similar vehicle, which may have a body 2 of any suitable form and construction according to the purpose for which it is to be used. This body is supported normally upon the top of a rectangular frame 3, which may be mounted upon any suitable running-gear. As shown, the latter comprises front and rear axles, upon which are the supporting-wheels 4. Journaled in suitable bearings in the side beams of tne frame 3 are two transverse shafts 5, on each of which is a pair of arms 6, connected by a rod 7, the latter having its ends passed through apertures in said arms and screw-threaded to receive nuts, as shown. Upon each of said shafts is a centrally-disposed arm 8, which projects at substantially right angles with respect to the arms 6. The two arms 8 are connected by a longitudinally-extending rod 9, which is made adjustable by forming it of two sections which have their oppositely-screw-threaded ends connected by a turnbuckle 10. The outer end of one of these rod-sections is pivotally connected to one of the arms 8, as shown at 11, and the outer end of the other of said rod-sections is pivotally connected to the other of said arms 8, as shown at 12. This connection 12 also includes one end of a link 13, which latter has its opposite end swiveled, as at 14, upon the inner end of a screw 15. This screw is mounted in a stationary nut 16, secured centrally in the rear end beam of the frame 3. Upon the outer end of the screw 15 is a square portion 16, adapted to fit in a similar shaped opening or socket formed in the hub of a hand-wheel 17. By means of the latter the screw may be operated to rock the shafts 5, and when said hand-wheel is not being used it may be removed from the screw and suspended from a hook 18, provided upon the rear of the frame 3. When the screw 15 is operated to rock said shafts, so that their arms 6 and rods 7 are swung from their normal, horizontal, or lowered positions to their upwardly-inclined or elevated positions, said rods 7 are adapted to elevate a pair of scale-levers 19 20, which latter will in turn elevate the wagon-body 2 and support it above the frame 1, so that its contents may be weighed. These levers 19 20 extend transversely and rest normally upon transverse beams or sleepers 21 within the frame 2, and they are only elevated to support the wagon-body when it is desired to weigh its contents. The lever 19 is substantially U shape in form, while the lever 20 is substantially Y shape in form and is adapted to support the lever 19, as shown at 22. The parallel ends or arms 23 of both of the levers are pivotally mounted upon the rods 7, as shown at 24, and they are adapted to be engaged by legs 25, which depend from the bottom of the body 2. The end or arm 26 of the lever 20 projects to one side of the frame 3 and is connected by a link 27 to the usual graduated scale-beam 28, mounted in the usual manner in a box or casing 29, provided upon one side of the frame 3.

The construction, operation, and advantages of the invention will be readily understood from the foregoing description, taken in connection with the drawings. It will be seen that when the parts are in their normal or lowered position the body 2 rests upon the frame 3 and the scale-levers 19 20 rest upon the cross bars or beams 21. When the screw 15 is turned by means of the hand-wheel 17 to swing the arms 6 and their rods 7 upwardly, the scale-levers will be elevated and said levers will in turn elevate the wagon-body, so that the contents of the latter may be readily weighed in the usual manner by means of the scale-beam 28.

While I have shown and described the preferred embodiment of the invention, it will be understood that I do not wish to be limited to the precise showing herein set forth and that various changes in the form, proportion, and minor details of construction may be resorted to within the scope of the invention as defined by the appended claims.

Having thus described my said invention, what I claim as new, and desire to secure by Letters Patent of the United States, is—

1. In a weighing-wagon, a frame, a wagon-body resting normally upon said frame, cross-bars in said frame, scale-levers resting normally upon said cross-bars, shafts in said frame, arms upon said shafts for elevating and supporting said levers above said cross-bars to cause said levers to elevate and support said body above said frame, and means for rocking said shafts.

2. In a weighing-wagon, a frame, a wagon-body resting normally upon said frame, cross-bars in said frame, scale-levers resting normally upon said cross-bars, shafts in said frame, arms upon said shafts for elevating and supporting said levers above said cross-bars to cause said levers to elevate and support said body above said frame, a second arm on each of said shafts, a rod connecting the last-mentioned arms, a stationary nut in said frame, and a screw in said nut and connected to said rod, substantially as described.

3. In a weighing-wagon, a frame, a wagon-body resting normally upon said frame, cross-bars in said frame, a pair of scale-levers resting normally upon said cross-bars, one of said levers bearing upon the other and the latter having an extended end, a scale-beam connected to said end, transverse shafts in said frame, pairs of arms upon said shafts, rods connecting the arms of each pair, said levers being pivotally mounted upon said rods, and means for rocking said shafts to elevate said levers above said cross-bars and cause said levers to elevate said body above said frame, substantially as described.

4. In a weighing-wagon, a frame, a wagon-body resting normally upon said frame, cross-bars in said frame, a pair of scale-levers resting normally upon said cross-bars, one of said levers bearing upon the other and the latter having an extended end, a scale-beam connected to said end, transverse shafts in said frame, pairs of arms upon said shafts, rods connecting the arms of each pair, said levers being pivotally mounted upon said rods, a second arm upon each of said shafts, a connecting-rod between the last-mentioned arms, a stationary nut in said frame, a screw in said nut, and a swiveled connection between said screw and said connecting-rod, substantially as described.

In testimony whereof I hereunto affix my signature in presence of two witnesses.

ROBERT B. ARNOLD.

Witnesses:
W. R. THACKER,
W. E. ROBERTS.